United States Patent
Wigger

(10) Patent No.: US 6,427,228 B1
(45) Date of Patent: Jul. 30, 2002

(54) COMBINING A META DATA FILE AND JAVA SOURCE CODE TO DYNAMICALLY CREATE JAVA CLASSES AND JAVABEANS

(75) Inventor: William Daniel Wigger, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/310,251

(22) Filed: May 12, 1999

(51) Int. Cl.[7] .................................................. G06F 9/45
(52) U.S. Cl. ............................... 717/7; 717/1; 707/203
(58) Field of Search .............................. 717/1, 8, 5, 7; 704/1, 4; 707/203, 523

(56) References Cited

U.S. PATENT DOCUMENTS 5,878,425 A * 3/1999 Redpath ..................... 707/102

(List continued on next page.)

OTHER PUBLICATIONS

Hunter et al. "Combining RDF and XML schemas to enhance interoperability between metadata application profiles"), ACM pp 457–466, May 2001.*

(List continued on next page.)

Primary Examiner—Anil Khatri
(74) Attorney, Agent, or Firm—Jeanine S. Ray-Yarletts; Marcia L. Doubet

(57) ABSTRACT

A technique for combining a meta data file and Java source code to dynamically create Java classes and JavaBeans. This technique enables creating objects and JavaBeans in a new, more flexible manner. An approach similar to, but different from, existing macro definition and expansion is used. According to the present invention, placeholders for parameter values are specified in the main source code file, and the values to be substituted for these placeholders are contained in an auxilliary file, referred to as a "meta file" or "meta data file". By isolating the parameter values outside the source code file in this manner, the values are much easier to change. The change does not affect the source code file itself. Instead, the change is reflected in a new file created during the expansion process. This approach enables an end-user to easily specify objects to be created, and/or the instance data to be used for creating a particular object (i.e. the values to be used for the parameters), without having to know Java code syntax and without having to obtain write permissions to the Java source code. The approach of the present invention also allows a particular macro to be used in different ways throughout a source code file. A particular macro name can be referenced multiple times in the source code file, with the ability to specify substitution of a selectable subset of the parameter values where that subset may change from one reference to another. In addition, a macro name can be specified multiple times in the meta file of the present invention, with parameter values that may change from one specification to another. Optionally, a conditional expansion feature may be used. The technique of the present invention may be used advantageously with object-oriented languages other than the Java programming language.

32 Claims, 13 Drawing Sheets

U.S. PATENT DOCUMENTS

| | | | | | |
|---|---|---|---|---|---|
| 5,946,487 | A | * | 8/1999 | Dangelo | 717/5 |
| 5,987,256 | A | * | 11/1999 | Wu et al. | 717/7 |
| 6,044,217 | A | * | 3/2000 | Breadly et al. | 717/1 |
| 6,061,721 | A | * | 5/2000 | Ismael et al. | 709/223 |
| 6,083,276 | A | * | 7/2000 | Davidson et al. | 717/1 |
| 6,085,198 | A | * | 7/2000 | Skinner et al. | 707/103 |
| 6,110,226 | A | * | 8/2000 | Bothner | 717/7 |
| 6,134,581 | A | * | 10/2000 | Ismael et al. | 709/202 |
| 6,151,703 | A | * | 11/2000 | Crelier | 717/5 |
| 6,173,441 | B1 | * | 1/2001 | Klein | 717/5 |
| 6,175,954 | B1 | * | 1/2001 | Nelson et al. | 717/2 |
| 6,226,675 | B1 | * | 5/2001 | Meltzer et al. | 709/223 |
| 6,233,586 | B1 | * | 5/2001 | Chang et al. | 707/103 |
| 6,237,135 | B1 | * | 5/2001 | Timbol | 717/1 |
| 6,266,666 | B1 | * | 7/2001 | Ireland et al. | 707/10 |
| 6,266,716 | B1 | * | 7/2001 | Wilson et al. | 710/33 |

OTHER PUBLICATIONS

Neumann et al, "Design and implemenation of flexible RBAC service in object orienetd scripting language", ACM CCS, pp 58–67, Nov. 2001.*

Dietrich et al, "A reusable graphical user interfcace for manipulating object orienetd dtabase using Java and XML", ACM SIGCSE, pp 362–366, Feb. 2001.*

Bouguettaya et al, "World wide database integrating the web, CORBA and database", ACM SIGMOD, pp 594–596, Aug. 1999.*

Dossick et al, "CHIME a metadata based distributed software development environment", Dept. of Com. Sci, Columbia Uni, pp 464–475, 1999.*

Taylor et al, "An integrated information system on thw web for catchment management", ACM GIS pp 8–13, Jan. 1998.*

* cited by examiner

305
Meta Data File: ExampleMetaFile.xml

310 <metaData>
 314 <MergeFilenames>
 318 <TemplateFilename>Example.java<.TemplateFilename>
 320 <OutputFilename>Final.java</OutputFilename>
 316 </MergeFilenames>

330
```
<DefinePreProcessingMacro> 332              338
  <MacroName>%Global</MacroName> 336
  <Param>Final</Param> 340
</DefinePreProcessingMacro> 334            342
```

350
```
<DefinePreProcessingMacro>                  354
  <MacroName>%Person</MacroName> 352
  <Param>oEntry1</Param>
  <Param>male</Param>
  <Param>John</Param>
  <Param>45</Param>
</DefinePreProcessingMacro>
```

370
```
<DefinePreProcessingMacro>                  374
  <MacroName>%Person</MacroName> 372
  <Param>oEntry2</Param>
  <Param>female</Param>
  <Param>Mary</Param>
  <Param>35</Param>
</DefinePreProcessingMacro>
```
312 </metaData>

405
Template File: Examplejava

410 %Global
    public class %1% extends Object414
412 %End    416
    {
420 %Person
422 DynamicObject %1% = new DynamicObject('"%3%",%4%);
    %End    424    426  428 int intEntries = 0;
    int intTotalAge = 0;
    int intAverageAge = 0;

// Constructor
430 %Global
432 %1%()
    %End
    {
    }
    // define main for Java application building
    public static void main(String args[])
    {    442
440 %Global    444
    %1% thisObject = new %1%();
    thisObject.SomeFunction();446
    %End
    }

// Function which uses meta data objects
    public void SomeFunction()
    { // Code which uses meta data objects
    %Person    452
451 %If%2% = male
    System.out.println("Male: Name is: " + %1%:getName() + " Age is: " + %1%.getAge());
450    %Endif    456    453    454
455 %If%2% = female
    System.out.println("Female: Name is: " + %1%.getName() + " Age is: " + %1%.getAge());
    %Endif    457    458
    %End // More Normal Java Code ....

FIG. 4B

```
//More code which uses meta data objects
%Person
AddToAverage(%1%.getAge());
%End
System.out.println("Average Age is: "+ intAverageAge);
} public void AddToAverage(int intAge)
{ intEntries++;
  intTotalAge+=intAge;
  intAverageAge = intTotalAge/intEntries;
  }
} class DynamicObject extends Object
{ String stringName;
  int intAge;

DynamicObject(String stringNameToBe, int intAgeToBe)
 { stringName = newString(stringNameToBe);
   intAge = intAgeToBe;
 } public String getName()
 { return stringName;
 } public int getAge()
 { return intAge;
 }
}
```

460 — %Person / AddToAverage(%1%.getAge()); / %End

505
resulting Output File: Final.java

512
510 public class Final extends Object
{
520 DynamicObject oEntry1 = new DynamicObject("John",45);
      522              528          524 526
530 DynamicObject oEntry2 = new DynamicObject("Mary",35);
      532                              534 536 int intEntries = 0;
   int intTotalAge = 0;
   int intAverageAge = 0;

// Constructor
540 Final()

// define main for Java application building
   public static void main(String args[])
   {   552              554
550 Final thisObject = new Final();
      thisObject.SomeFunction();556
   }

// Function which uses meta data objects
   public void SomeFunction()
   { // Code which uses meta data objects   564
560 System.out.println("Male: Name is: " + oEntry1.getName() +" Age is: " +
566 oEntry1.getAge());   562
570 System.out.println("Female: Name is: " + oEntry2.getName() + " Age is: " +
576 oEntry2.getAge());   572              574

// More Normal Java Code ....

// More code which uses meta data objects           582
580 AddToAverage(oEntry1.getAge());
590 AddToAverage(oEntry2.getAge());                  592
594 System.out.println("Average Age is: " + intAverageAge);

public void AddToAverage(int intAge)
   { intEntries++;
     intTotalAge += intAge;
     intAverageAge = intTotalAge/intEntries;
   }
}

FIG. 5B

598 class DynamicObject extends Object
   { String stringName;
     int intAge;

DynamicObject(String stringNameToBe, int intAgeToBe)
     { stringName = new String(stringNameToBe);
       intAge = intAgeToBe;
     } public String getName()
     { return stringName;
     } public int getAge()
     { return intAge;
     }
   }

FIG. 6

Results of running the Final.java application:

| | |
|---|---|
| 610 | Male: Name is: John Age is: 45 |
| 620 | Female: Name is: Mary Age is: 35 |
| 630 | Average Age is: 40 |

COMBINING A META DATA FILE AND JAVA SOURCE CODE TO DYNAMICALLY CREATE JAVA CLASSES AND JAVABEANS

BACKGROUND OF THE INVENTION

1. Field of the Invention

The present invention relates to the field of computer programming, and more particularly to a system, method, and computer-readable code for combining a meta data file and Java source code to dynamically create Java classes and JavaBeans. This technique enables creating objects and JavaBeans in a new, more flexible manner.

2. Description of the Related Art

Java is an object-oriented programming language. As with programs written in other object-oriented languages, Java programs operate by instantiating objects and invoking methods upon these objects. "JavaBeans" is the name of a component architecture for use with the Java programming language. ("JavaBeans" and "Java" are trademarks of Sun Microsystems, Inc.) A JavaBean is the Java term for a "component", where a component is a reusable building block of application logic that a programmer can combine with other components to form an application program.

A Java programmer creates a Java application program by writing new code and assembling existing components (i.e. JavaBeans), to provide the desired functionality for his application. A JavaBean may contain code for a relatively simple function such as displaying a button on a graphical user interface ("GUI"), but it may also contain quite complex code. JavaBeans are intended to execute locally, within the Java Virtual Machine ("JVM") on which a Java application is running.

To create an object in the current art, the Java programmer specifies code that invokes a constructor method that is called, by convention, "new". This method may be defined in the class for which an object is to be instantiated, or in a superclass from which this class inherits in the object hierarchy. The constructor method defines functionality that is to be performed when constructing, or instantiating, a new object. The constructor method may optionally use parameters, which will be used to specify initialization values, known as "instance data", for the newly-created object.

However, the current art requires a static, predefined specification of the objects to be created, where this predefined specification includes the values that are to be used for initializing the instance data parameters. The code instantiating an object is coded directly into the source code of a Java program. The parameter values may be specified in the source code, or they may be obtained at run-time. For the latter case, the values may be read from a file, obtained from a user by prompting, or passed as invocation parameters.

It may happen that there is a need to create a large number of objects, either in a single class or in different classes. Further, there may be a need to enable an end-user of an application to specify the objects, and/or the instance data values, to be used by the application. There is currently no convenient way to handle these situations. The current art requires statically specifying the creation of each object in the Java source code. In addition, the end-user will likely be unable to change the source code (either due to lack of Java programming skills, or code locking techniques which prevent changing the code base, or both) to modify the objects and/or instance data specified in the program.

Accordingly, what is needed is a technique whereby the objects to be created during execution of a Java program can be dynamically specified, and whereby the values to be used for instantiating these objects can also be dynamically specified.

SUMMARY OF THE INVENTION

An object of the present invention is to provide a technique for more easily and efficiently creating objects for use in the Java programming language.

Another object of the present invention is to provide this technique such that it enables more easily and efficiently creating JavaBeans.

A further object of the present invention is to provide this technique by combining a meta data file and Java source code to dynamically create Java classes and JavaBeans.

Yet another object of the present invention is to provide this technique in a manner that defines all instance data for a particular object in a separate file from the Java source code.

Still another object of the invention is to provide this technique in a manner that isolates all Java source code for a particular application in a separate file from the instance data used to create objects for that application.

A further object of the present invention is to provide a technique whereby an end-user can conveniently specify creation of objects and/or values to be used for instance data of created objects.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a system, method, and computer-readable code for combining a meta data file and an object-oriented source code input file to create an object-oriented source code output file that will be used to dynamically create objects at compile time in a computing environment. In one aspect, this technique comprises: creating a meta data file, wherein the meta data file includes specifications for one or more macros, each of the macro specifications comprising: a name for a particular macro, wherein the same name may be specified in one or more of the macro specifications; and values for one or more parameters for the particular macro; creating an object-oriented source code input file, wherein the input file comprises a plurality of lines, and wherein each of the lines may be characterized as a normal object-oriented source code statement or as a line within a scope of a macro reference; copying each of the normal object-oriented source code statements to an object-oriented source code output file; and processing each of the lines within the scope of the macro reference. The processing further comprises: locating one or more matching macro specifications in the meta data file, wherein the name of the matching macro specification is identical to a reference name used in the macro reference; expanding the lines within the scope of the macro reference using the one or more located specifications; and writing the expanded lines to the output file. Preferably, the processing of each of the lines further comprises: detecting an opening macro reference, the opening macro reference specifying the reference name, and wherein the detected opening reference begins the scope of the macro reference; detecting a closing macro reference, wherein the detected closing reference ends the scope of the macro reference; and wherein the detected opening and closing macro references are not themselves expanded.

In one embodiment, the expanding preferably further comprises: parsing each of the lines within the scope of the macro reference; copying each of the parsed lines which does not contain a macro parameter reference to the output file; and expanding the parsed line using the located macro specification when the parsed line contains one or more of the macro parameter references. Expanding the parsed line preferably further comprises: retrieving a corresponding one of the parameter values from the located macro specification using a sequence number from the macro parameter reference; and substituting the retrieved parameter value for the macro parameter reference, wherein the retrieving and the substituting are repeated for each of the one or more macro parameter references in the parsed line.

In another embodiment, the expanding preferably further comprises: parsing each of the lines within the scope of the macro reference; detecting an opening conditional macro processing statement in the parsed line; evaluating the detected opening conditional macro processing statement; bypassing one or more lines within the scope of said macro reference until detecting an ending conditional macro processing statement when the evaluating has a negative result; and expanding one or more lines of the input file when the evaluating has a positive result, until detecting said ending conditional macro processing statement. Preferably, the evaluating has a positive result when a condition on the opening conditional macro processing statement evaluates to a Boolean value "True", and the evaluating further comprises: locating a string value in the condition; retrieving a corresponding condition value from the located macro specification using a conditional parameter sequence number from the condition; and comparing the retrieved corresponding value to the string value. The expanding preferably further comprises: parsing each of the lines within the scope of the macro reference; copying each of the parsed lines which does not contain a macro parameter reference to the output file; and expanding the parsed line using the located macro specification when the parsed line contains one or more of the macro parameter references. Expanding the parsed line preferably further comprises: retrieving a corresponding one of the parameter values from the matching macro specification using a sequence number from the macro parameter reference; and substituting the retrieved parameter value for the macro parameter reference, wherein the retrieving and the substituting are repeated for each of the one or more macro parameter references in the parsed line.

The object-oriented source code input file and the object-oriented source code output file may use the Java programming language.

In a further aspect, the present invention provides a technique for combining a meta data file and Java source code file to dynamically create Java classes and JavaBeans. The technique comprises: a meta data file, wherein the meta data file includes specifications for one or more macros, each of the macro specifications comprising: a name for a particular macro, wherein the same name may be specified in one or more of the macro specifications; and values for one or more parameters for the particular macro; a Java source code input file, wherein the input file comprises a plurality of lines; a Java source code output file; reading each of the lines of the input file; determining, responsive to the reading, whether the read line is within a scope of a macro reference; copying the read line to the output file when the determining has a negative result; and expanding the read line using the meta data file when the determining has a positive result. The expanding preferably further comprises: parsing each of the lines within the scope of the macro reference; copying each of the parsed lines which does not contain a macro parameter reference to the output file; expanding the parsed line when the parsed line contains one or more of the macro parameter references; and writing the expanded parsed line to the output file. Preferably, the determining has a positive result when an opening macro reference has been encountered but a corresponding closing macro reference has not; and the expanding of the parsed line further comprises: locating one or more matching macro specifications in the meta data file using a reference name from the opening macro reference to match the macro name in the meta data file; and using each of the matching macro specifications to create the expanded parsed line. Using the matching macro specifications to create the expanded parsed line preferably further comprises: retrieving a corresponding one of the parameter values from the matching macro specification using a sequence number from the macro parameter reference; and substituting the retrieved parameter value for the macro parameter reference, wherein the retrieving and the substituting are repeated for each of the one or more macro parameter references in the parsed line.

In yet another aspect, the present invention provides a technique for combining a meta data file and an object-oriented source code input file to create an object-oriented source code output file that will be used to dynamically create objects at compile time in a computing environment. This technique further comprises: creating a meta data file, wherein the meta data file includes specifications for one or more macros, each of the macro specifications comprising: a name for a particular macro, wherein the name may be specified in one or more of the macro specifications; and values for one or more parameters for the particular macro; creating an object-oriented source code input file, wherein the input file comprises a plurality of lines, selected ones of the lines including one or more macro references; and creating an object-oriented source code output file by expanding the macro references in the source code input file using corresponding ones of the macro specifications in the meta data file.

The present invention will now be described with reference to the following drawings, in which like reference numbers denote the same element throughout.

BRIEF DESCRIPTION OF THE DRAWINGS

FIG. 3 illustrates an example of the meta file used by the present invention to define the macros which specify objects and their instance data values;

FIG. 4 provides an example of a Java source code file which refers to dynamically-specified object information defined with the macro technique of the present invention;

FIG. 5 illustrates an example of the modified Java source code that results from use of the present invention;

FIG. 6 illustrates the outcome of executing the source code in the example of FIG. 5.

DESCRIPTION OF THE PREFERRED EMBODIMENT

Figure 1:
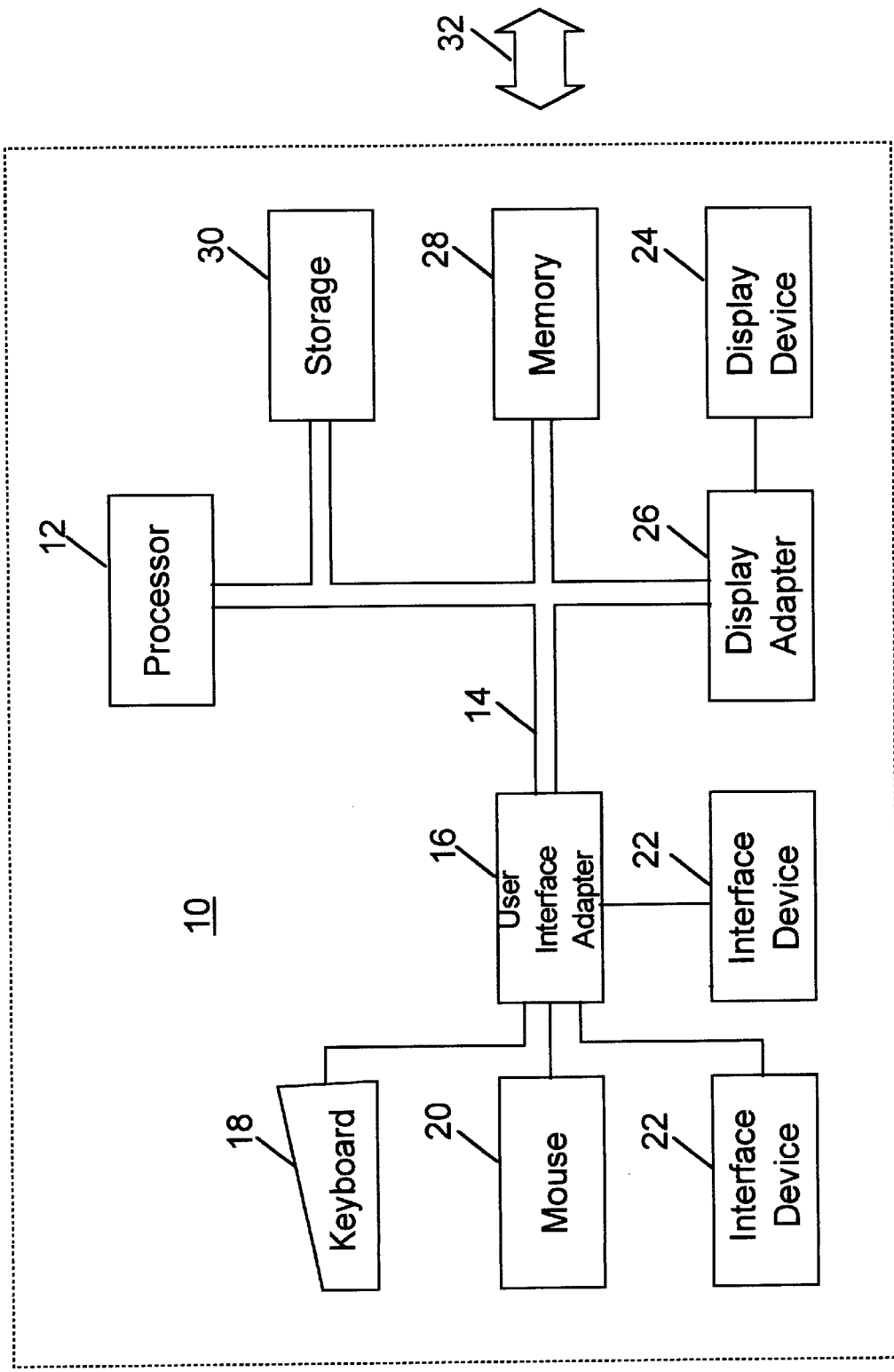
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
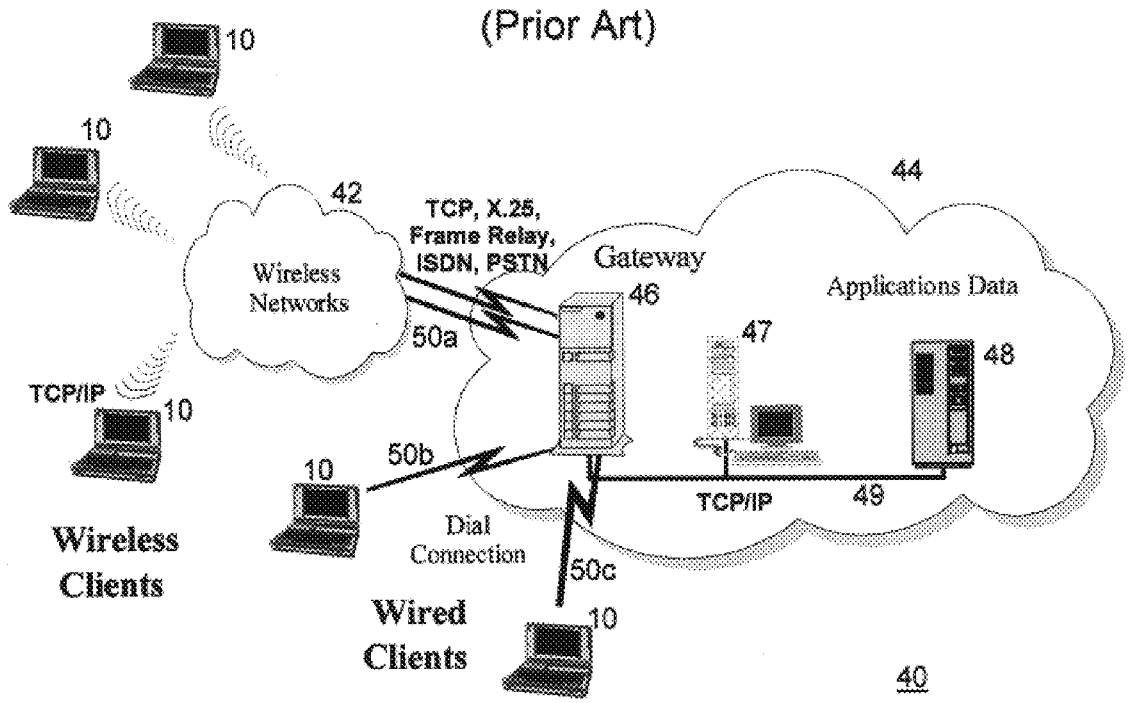
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, or an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 or server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

In the preferred embodiment, the present invention is implemented as one or more computer software modules (also referred to as code subroutines, or "objects" in object-oriented programming). The present invention will be used to preprocess Java source code, before compilation of the resulting modified source code. This preprocessor may execute on a user's workstation, or on a server in a network. Following operation of the present invention, the modified source code will then be compiled. The present invention may be incorporated into a compiler, so that the preprocessing step is automatically followed by code compilation, or it may be implemented as a standalone process that is invoked separately from a compiler. After execution of the compilation process, the compiled code is executed as in the prior art, whether on the user's workstation or on a server. For ease of reference, the following discussion will refer to operation of the present invention as occurring on a user's workstation.

Note that the preferred embodiment of the present invention is discussed with reference to processing and generating Java source code. The novel techniques disclosed herein may be advantageously used for creating objects in other object-oriented languages as well, such as C++, and thus references to Java code herein are intended as means of illustration and not of limitation.

A Java development environment typically includes class libraries for use by developers when programming (i.e. developing applications) in the Java language. Development environments for other object-oriented languages typically include similar class libraries for use with the respective programming language. Class libraries are reusable sets of reusable classes which typically provide relatively high level functionality. A class is one of the basic building blocks of object-oriented languages such as Java, and comprises code which represents a combination of logic function and data.

A developer creates an application by adding classes from a class library to the software application being created. A copy, or "instance", of a class is then included in the application. Using the Java terminology, one or more classes may be combined to form a JavaBean, and one or more JavaBeans may then be combined to form an application. These concepts and techniques of Java programming are well known to those skilled in the art, and will not be discussed in depth herein.

The preferred embodiment of the present invention will now be discussed in more detail with reference to FIGS. 3 through 7.

The present invention uses a technique that is somewhat similar to, although different from, the manner in which macros are used in programming languages. As is known in the art, a macro is used as a type of shorthand specification. Some sequence of characters is defined as the macro definition, where this is typically a lengthy sequence that needs to be used more than once. Macro functionality is typically implemented with a three-step process. When used with a programming language, the first step is creation of the macro definition, where that definition contains programming source code and is stored in some auxilliary file (i.e. in a file separate from an application program that will use the macro). This definition may also be referred to as the macro "template". In the "C" programming language, for example, macro templates are stored in files having the specially-designated file type ".h". Second, a reference to the macro is specified in a programming source code file. Typically, some special syntax such as "&" is used to signify that a macro reference is being made. Macros may optionally be parameterized, where the template specifies placeholders for parameters, and the reference supplies values to be used for those parameters. Third, a tool (usually a preprocessor within a compiler) updates the programming source code by replacing the macro reference with the macro template, and substituting the specified parameter values into the template for parameterized macros. This updating process is known as macro expansion, or macro substitution. This expansion process enables simple, efficient code reuse.

The present invention uses this macro expansion concept, but alters the conventional approach to provide a novel technique for generating Java objects and/or JavaBeans. The roles of the auxilliary and main files (where "main file" refers to the file containing the macro reference) are inverted in this technique. In the prior art, the auxilliary file contains placeholders for the values to be substituted during expansion, and the main file specifies what those values are for a particular expansion. In the present invention, the placeholders are specified in the main file, and the values to be substituted are contained in the auxilliary file (referred to hereinafter as the "meta file" or "meta data file"). By isolating the parameter values outside the source code file in this manner, the values are much easier to change. The change does not affect the source code file itself. Instead, the change is reflected in a new file created during the expansion process. This approach enables an end-user to specify the change (i.e. to specify the values to be used for the parameters), without having to know Java code syntax and without having to obtain write permissions to the Java source code.

In addition, the novel technique of the present invention expands the use of the macro facility as contrasted to the prior art, by allowing a macro to be used in different ways throughout a source code file. The macro reference technique used by the present invention enables a particular macro name to be referenced multiple times in the source code file, with the ability to specify substitution of a selectable subset of the parameter values where that subset may change from one reference to another. In addition, a macro name can be specified multiple times in the meta file of the present invention, with parameter values that may change from one specification to another.

The manner in which the present invention defines and references macros will now be illustrated with reference to an example, provided in FIGS. 3 through 6. FIG. 3 shows an example of the auxilliary file, or meta file. FIG. 4 shows an example of a Java source code file that refers to macro specifications in this meta file. FIG. 5 shows the modified Java source code file that results from application of the present invention. The code in this output file contains generated code that, when executed, will result in creation of several objects. In addition, the code in this output file may be used as one or more JavaBeans, generated by using the present invention. Finally, FIG. 6 shows the outcome that results from executing the code of this example.

In the preferred embodiment, the syntax of the Extensible Markup Language ("XML") is used to specify the meta file, as illustrated in FIG. 3. XML is a well-defined notation, which simplifies parsing of the file contents. (For more information on XML, refer to "Extensible Markup Language (XML), W3C Recommendation Feb. 10, 1998" which is available on the Web at http://www.w3.org/TR/1998/REC-xml-19980210. "XML" is a trademark of Massachusetts Institute of Technology.) Alternative notations may be used without deviating from the invention concepts disclosed herein.

The meta file 300 has a file name, which in this example is "ExampleMetaFile.xml" as shown at 305. An opening and closing tag is used to bracket the meta file XML contents, as shown by tags 310 and 312. It will be obvious to one of ordinary skill in the art that the keyword syntax used within the tags of FIG. 3 is merely illustrative, and that other keywords may be substituted. In addition, tags (such as 310 and 312) to bracket the meta file contents may not be needed when alternative notations are used to specify the meta file. A tag pair 314, 316 is used to bracket the file names 318, 320 used with the preferred embodiment. As shown at 318, the file containing the Java source code which contains references to the meta file is specified within an XML tag pair, and for this example has the file name "Example.java". The file that will contain the modified Java source code is also specified using an XML tag pair, and has the file name "Final.java" in this example, as shown at 320. In an alternative embodiment, the outer tags 314, 316, may be omitted from the specification of the file names 318, 320 within the meta file. In yet another alternative embodiment, the file names may be obtained in other manners, such as specifying the names as invocation parameters to the preprocessor, prompting a user to enter the file names, etc.

Following specification of the file names, one or more macro names will be specified, along with the values to be used for parameters when the macro is expanded. FIG. 3 shows 3 macro specifications, at 330, 350, and 370, although more or fewer may be used in an actual meta file. Each macro specification is bracketed by a tag pair, which in the preferred embodiment is illustrated with the keyword syntax "DefinePreProcessingMacro" (see, for example, tags 332 and 334). The macro name is specified first, within the "MacroName" tags, as shown at 336, 352, and 372. The first macro of this example has the name "%Global", as shown at 338. The second and third macros of the example both have the name "%Person", as shown at 354 and 374. As discussed earlier, the present invention enables multiple specifications of a particular macro, where the values of the parameters may change from one specification to another. This is illustrated by the multiple specifications 350, 370 of the "%Person" macro. (The preferred embodiment uses the symbol "%" to denote macro processing syntax (i.e. references to macros and specifications thereof).

The values to be used as macro parameters during expansion are specified in the meta file following the macro name. In general, a macro specification may have any number of parameter values, each of which is enclosed within tags having a keyword such as "Param" (as illustrated at 340). In this example, the macro "%Global" has a single parameter, which for this occurrence of the specification has the value "Final" (as shown at 342). The macro "%Person" has 4 parameters. In the first specification 350 of this macro within the meta file, these parameters have the values "oEntry1", "male", "John", and "45". In the second specification 370, the values are "oEntry2", "female", "Mary", and "35".

The example Java source code file 400 of FIG. 4 has the file name "Example.java", as shown at 405. This example file contains a number of references to macro specifications in the meta file 300 of FIG. 3. One such reference appears at 410, referring to the %Global macro. In the preferred embodiment, each macro reference in the source code file has a corresponding end delimiter, which indicates the scope of the expansion process for this particular macro. This end delimiter is shown as the keyword "%End" in FIG. 4. See, e.g., element 412. In this case, the scope of the macro expansion is the single source code statement 414. This statement 414 contains a parameter reference, or placeholder for an actual parameter value. In the preferred embodiment, a parameter reference is specified by enclosing a number within "%" symbols, where this number identifies which parameter for this macro is to be used. Accordingly, the parameter reference 416 refers to the first parameter for the corresponding macro. In the modified source code file 500 of FIG. 5, it can be seen that the statement 414 has been expanded as statement 510. (As will be obvious, the macro references do not appear in the output file that results from the macro expansion, and thus the macro names, parameter references, and end delimiters such as 410, 416, and 412 are not found in output file 500.) Where the parameter reference "%1%" appeared in the input source file 400 (see element 416), the expansion process substituted the value "Final" at 512. This value 512 was defined at 342 in the meta file 300, as the value of the first parameter 340 of the macro %Global 330. The source file 400 contains subsequent references 430 and 440 to the %Global macro, which also refer 432, 442, 444 to the first parameter value. As can be seen at 540 and 550 of the modified source file 500, the parameter value has been expanded for these references as well. (The technique with which the expansion process is performed is explained in detail below, with reference to FIG. 7.)

As will be evident to one familiar with the Java programming language, the macro reference at 410 (and more specifically, at 416) enables dynamic specification of a class name in a class definition 510, and the reference at 430 (and more specifically, at 432) specifies this class name in a statement that expands to a constructor 540. The references 442 and 444, when expanded at 552 and 554, enable invocation of a method in the dynamically-specified class to create a dynamically-specified object in this class.

Note that some of the source code statements within the scope of a macro reference may not include any macro reference syntax. This is illustrated in FIG. 4A by the source code statement at 446, which is within the scope of the reference 440 to the %Global macro specification. Such lines will be copied to the output source code file unchanged, as shown in FIG. 5A at 556. If multiple specifications for the macro reference (e.g. as in the multiple occurrences 354, 374 of %Person) had been located in the meta file, then the statement 446 would have been copied into each expansion in the output file.

The macro %Person is also referenced multiple times 420, 450, 460 in the input source code file 400. These references illustrate the ability provided by the present invention to selectably change the parameter values which are used from one reference to another, providing a very powerful technique for working with instance data of an object. The macro reference at 420 uses the first, third, and fourth parameter values, as specified at 424, 426, and 428, respectively. This reference is expanded twice in the output source code file 500, at 520 and 530. This is because there were 2 separate specifications 350, 370 for the %Person macro in the meta file 300. The expansion at 520 corresponds to the specification 350, and the expansion at 530 corresponds to the specification at 370. Accordingly, each expansion uses the values (522, 524, and 526 in expanded statement 520, and 532, 534, 536 in expanded statement 530) from a different specification from the meta file. As will be evident, the syntax of statement 520 creates a new object having the name "oEntry1" as shown at 522, where this object is a new instance of the DynamicObject class (see element 528), and which has instance data values "John" and 45, specified at 524 and 526. (The DynamicObject class and its methods are defined at 598.) A second new object is created by the syntax at 530, where this object has the name "oEntry2", and instance data values "Mary" and 35, as shown at 532, 534, and 536. If more than two such objects are desired at a later time, all that is required according to the present invention is to expand the meta file to include the additional specifications, and then to perform the preprocessing and compilation steps again.

The macro references at 450 and 460 illustrate code that operates upon the dynamically-created objects. Beginning with the simpler usage, reference 460 specifies a method invocation "getAge" on a dynamically-generated object name, where the result of this method is then used as a parameter for another method invocation "AddToAverage". As shown in the corresponding expanded code at 580 and 590, the method invocations are first performed for the object named "oEntry1" as shown at 582, and are then performed for the object "oEntry2" as shown at 592. As previously discussed with reference to the macro reference at 420, the expansion process generates one occurrence of the macro template (that is, the syntax that occurs within the scope of the macro reference) for each specification of the macro in the meta file 300. By appropriate placement of the end delimiter in the input source code file, the programmer controls which statements will be duplicated when multiple macro specifications exist in the meta file.

Macro reference 450 illustrates an optional conditional processing feature of the preferred embodiment. This conditional feature is indicated by the presence of the keyword "%If", as shown at 451 and 455. This syntax is followed by a condition that is to be tested during the expansion process, such that the expansion will only be performed if the condition evaluates to the Boolean value True. In the first example 451, the condition 452 to be tested is "%2%==male". In the second example 455, the condition 456 is "%2%=female". The syntax %2% is the parameter reference syntax of the present invention, resulting in comparison of the value of the second parameter of a particular macro specification from the meta file 300 to the values male and female. When this second parameter has the value male, the syntax at 451 will be expanded and the syntax at 455 will be suppressed, and vice versa when the second parameter has the value female. As seen in the modified source code 500, the syntax at 451 has been used for the first occurrence 350 of the %Person macro in the meta file 300, and the syntax at 455 has been used for the second occurrence 370. These generated statements 560 and 570 will cause different objects to be accessed (see elements 564 and 574, for example) for method invocations. In addition, different behavior—the printing of different text at 562 and 572—will occur that is separate from the differences in the objects. Note that while the example 450 shows the conditional keyword at 451 immediately following the macro reference, this is merely an illustration. The conditional syntax may appear anywhere within a macro reference (provided the opening and closing keywords are the first token on the line, and in the case of the closing keyword, the only token on the line).

FIG. 6 shows 3 lines of printed output generated by executing the modified source file 500 (after compilation thereof). The first output line 610 is a result of executing the generated statement 560, which prints the text "Male:", followed by the text "Name is", followed by the result obtained from invoking the methods getName and then getAge on the first generated object, oEntry1. Execution of the generated statement 520 caused this object to have the name John and the age 45, as represented in output line 610. The second output line 620 is a result of executing the generated statement 570, which prints "Female:" instead of "Male:" and invokes the methods on the second generated object, oEntry2. The generated statement 530, when executed, caused this second object to have the name Mary and the age 35. Finally, output line 630 results from executing generated statements 580 and 590, which accumulate the sum of 45+35=80 as the total age, and the statement 594 which then prints the average of the accumulated ages.

Figure 7A:
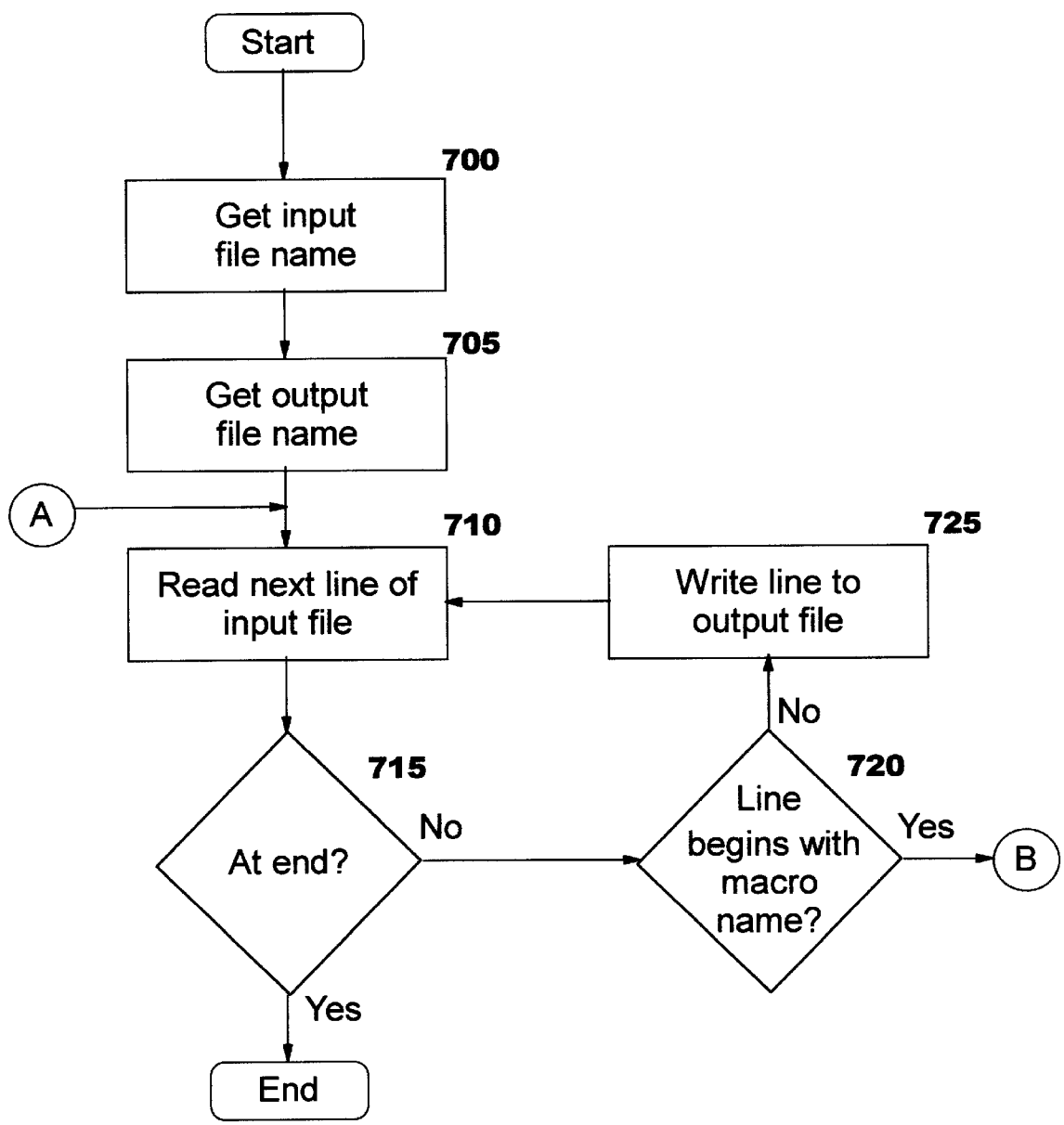
FIGS. 7A through 7E provide flowcharts illustrating the logic which may be used to implement the preferred embodiment of the present invention.

The logic with which the preferred embodiment may be implemented will now be discussed with reference to the flowcharts in FIGS. 7A through 7E. Preferably, the implementation of the preprocessor is invoked with the name of the meta file to be processed, where the meta file then specifies the input source code file and the output source code file (as shown at 318 and 320 of FIG. 3). Thus, FIG. 7A shows the first steps in the implementation as obtaining these file names, where Block 700 obtains the input source file name and Block 705 obtains the output file name. This processing comprises reading the specified meta file, searching for the predetermined keyword syntax which brackets each file name. Using the example meta file 300 of FIG. 3, Block 700 locates the opening tag at 318 containing the keyword "TemplateFilename", and then retrieves the token following this tag but preceding the corresponding ending tag. Block 705 then locates the opening tag at 320, which contains the keyword "OutputFilename", and retrieves the token following this tag. Error handling logic may be added to FIG. 7A to account for the situation in which either of the predetermined tags is not found, using techniques which are well known in the art. In an alternative embodiment, all three file names may be specified as input to the preprocessor, in which case Blocks 700 and 705 will be omitted.

Block 710 begins an iterative loop that is used to process the input source code file. The next line from the file is read, and Block 715 then checks to see if the end of the input file has been reached. When this test has a positive response, the preprocessing macro expansion of the present invention is complete, and the operation of the logic in FIG. 7A ends. Otherwise, control transfers to Block 720.

Block 720 checks to see if this line from the input source code file begins with a macro name. If not, then this is normal Java syntax. Block 725 copies this line to the output file without change, and returns control to Block 710 to read the next line from the input file. Otherwise, when Block 720 has a positive result, then a macro reference as defined by the present invention has been detected in the input file. Processing of this macro reference continues at Block 730 of FIG. 7B.

Figure 7B:
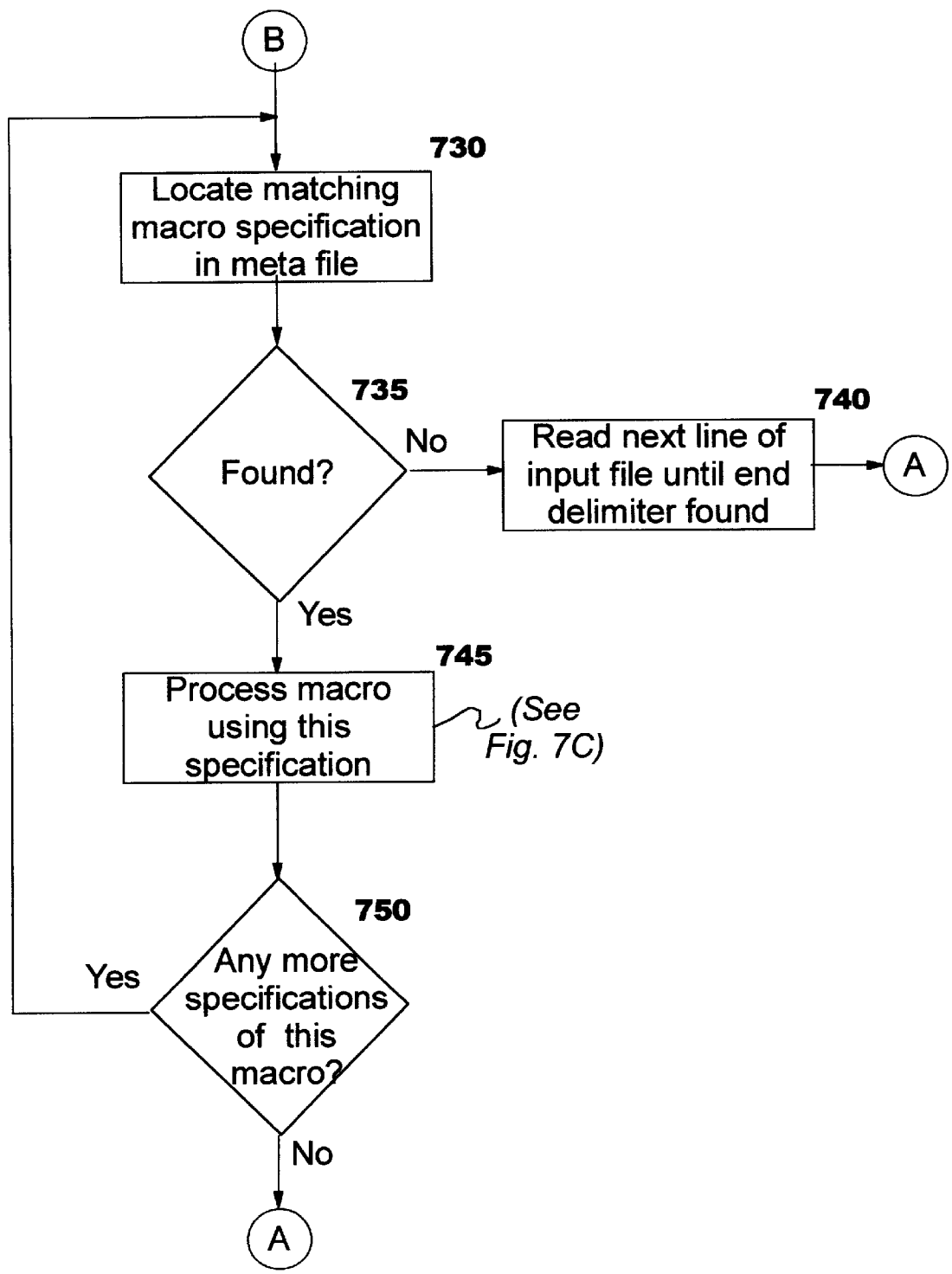

The logic in FIG. 7B represents a loop that is executed to process each macro reference in the input source code file. Upon entering this logic, a macro reference has already been located in the input file. Block 730 locates a matching macro specification (that is, a macro specification having the same name within the MacroName tags, which are illustrated at 336, 352, and 372 of FIG. 3) in the meta file. If no matching specification is found, then the test at Block 735 has a negative result. As shown at Block 740, the preferred embodiment will continue to read lines from the input file until encountering the end delimiter for the macro reference, where none of the intervening statements is written to the output file, and then transfers control to Block 710 of FIG. 7A to continue processing the remainder of the input file. A warning message may be generated in this situation if desired (not shown in FIG. 7B).

It may happen that the macro specification was located in the meta file by Block 730, but it cannot be read. (For example, when XML is used to specify the meta file and the end tag "</MacroName>" has erroneously been omitted from the meta file, then the macro specification cannot be read.) The preferred embodiment treats this situation as a fatal error. An error message will be generated, and processing will halt. It will be obvious to one of skill in the art how this error processing can be added to the logic of FIG. 7B.

When the macro specification is found in the meta file (and can be read), Block 735 has a positive result. Control reaches Block 745, where the macro reference from the template is expanded using the macro specification located by Block 730. This process is more fully described by FIG. 7C. Upon completion of the expansion, Block 750 asks whether the meta file contains any more specifications for this macro name. If so, then the next specification is processed by returning control to Block 730; otherwise, the expansion of the current macro reference is complete, and control returns to Block 710 to process the subsequent lines of the input file.

Figure 7C:
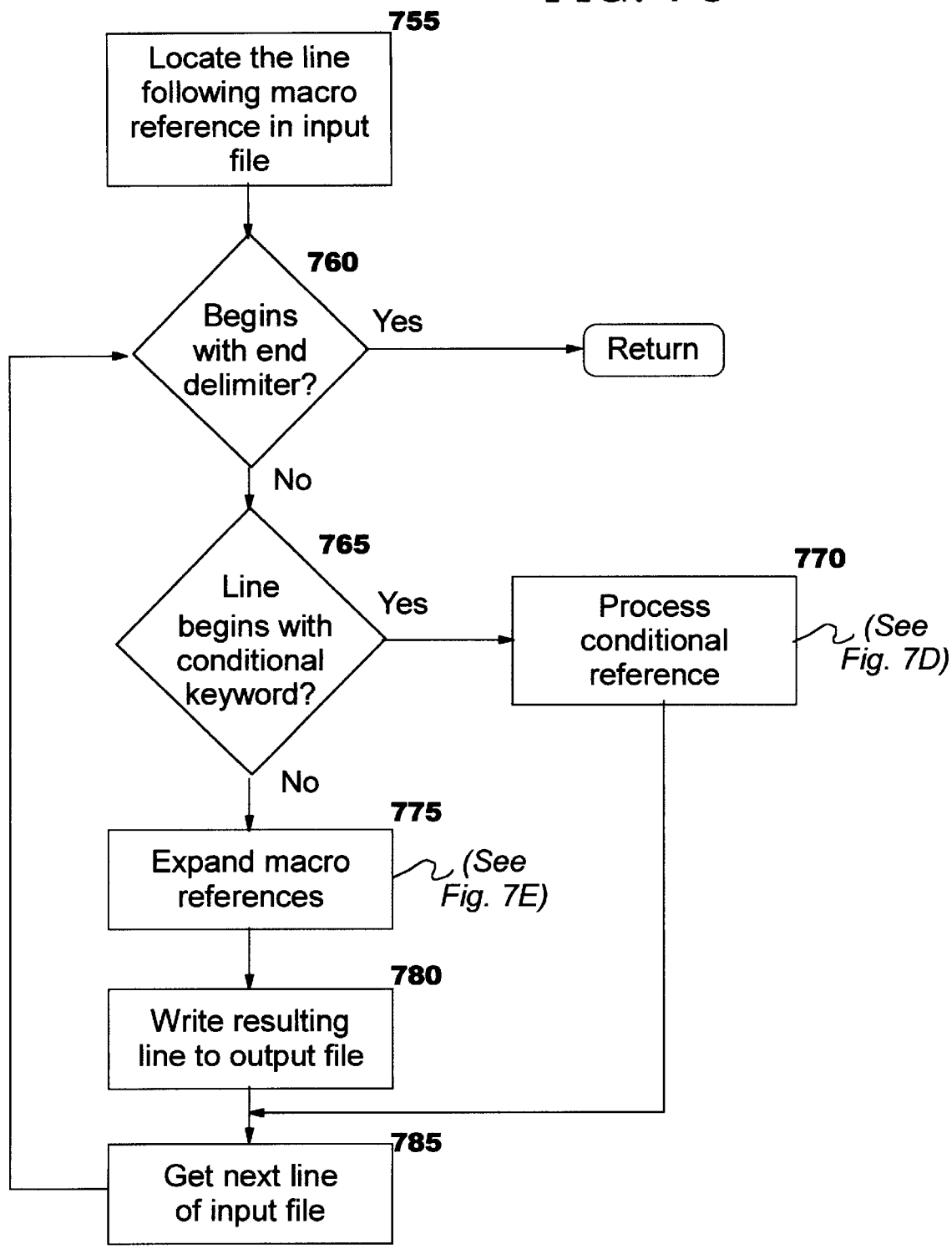

FIG. 7C depicts a loop that is executed to expand a macro reference for a particular occurrence of a macro specification in the meta file. Upon entering this processing, a pointer or other location indicator has been positioned (by Block 730) at the line of the meta file which contains the macro name for this specification. Block 755 locates the line which follows the macro reference in the input source code file. Block 760 checks to see if this line begins with the end delimiter. If so, then the test at Block 760 has a positive result, and the processing of FIG. 7C ends. Control returns to the invoking logic, which is Block 745 of FIG. 7B. Otherwise, when the test at Block 760 has a negative result, there are still lines in the input file to be processed within the scope of this macro reference.

Block 765 asks whether the line from the input file contains the conditional keyword syntax, which in the preferred embodiment is "%If". If so, then Block 770 processes the conditional expansion, as further described below with reference to FIG. 7D. After completion of this conditional expansion, control transfers to Block 785. When Block 765 has a negative result, Block 775 processes any macro references within this input line, using the process described in more detail by FIG. 7E, below. Following completion of Block 775, Block 780 writes the resulting line to the output file. Block 785 then reads the next line from the input file, and returns control to Block 760 to begin the processing of this line.

Figure 7D:
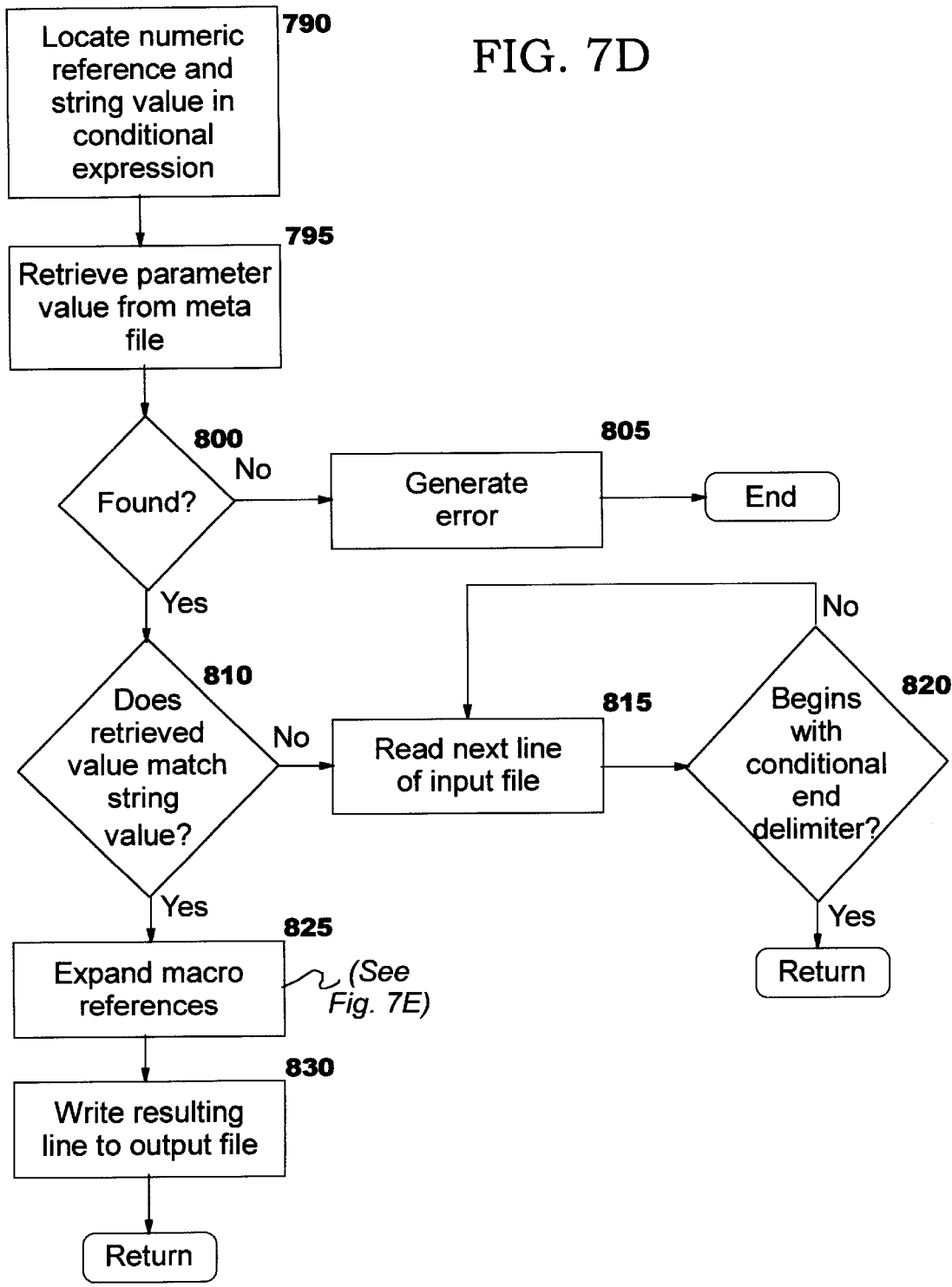

FIG. 7D depicts the logic used to implement the optional conditional expansion feature of the present invention. The process begins at Block 790. According to the preferred embodiment, the leftmost token within this expression must be a numeric reference to a macro parameter for the current macro, using the same macro parameter reference syntax used for other, unconditional parameter references. This token is followed by an equivalence token, which in the preferred embodiment is the symbol "==". The final token in the conditional expression is a string value. Block 790 obtains the numeric reference and the string value from this conditional expression. Block 795 then retrieves the value of the indicated parameter from the meta file. Block 800 checks to see if an error was encountered during this process (for example, where the number may exceed the number of parameters defined for this macro specification). If so, the preferred embodiment generates a fatal error condition, and halts processing, as depicted by Block 805. Alternatively, it may be desirable to continue processing the input file. This case is preferably handled by reading each subsequent line from the input file, until reaching the conditional processing end delimiter (which uses the syntax "%Endif" in the preferred embodiment), without writing any of the intervening lines to the output file. Once the conditional end delimiter has been reached, the remainder of the file can be processed by returning control to Block 785 of FIG. 7C.

It may happen that the parameter was located in the meta file by Block 795, but its value cannot be read. (For example, when XML is used to specify the meta file and the end tag "</Param>" has erroneously been omitted from the meta file, then the parameter value cannot be read.) The preferred embodiment treats this situation as a fatal error. An error message will be generated, and processing will halt. It will be obvious to one of skill in the art how this error processing can be added to the logic of FIG. 7D.

When the parameter value was located in the meta file (and can be read), Block 800 has a positive result. Processing continues at Block 810, which checks whether the retrieved parameter value matches the string value specified in the conditional expression. If not, then this macro reference is not to be expanded. Blocks 815 and 820 suppress expansion of the macro by reading the next line of the input file, searching for the conditional end delimiter. While this delimiter has not been located, Block 815 and 820 repeat. When the delimiter is located, Block 820 has a positive result, and control returns to the invoking code (which is Block 770 of FIG. 7C).

It may happen that a parameter is located in the meta file by Block 795, but the value for the parameter is empty. In the preferred embodiment, this situation is handled by forcing the outcome of Block 810 to the value "No" (using error-handling logic which is not depicted in FIG. 7D, but which may easily be added by one of skill in the art). This approach causes the conditional expansion to be bypassed, by executing the code corresponding to Blocks 815 and 820. A warning message may be generated for this situation if desired.

When the test at Block 810 has a positive result, then this conditional macro reference will be expanded, as indicated by Block 825. Block 825 uses the processing described with reference to FIG. 7E. Upon returning from the macro expansion process, Block 830 writes the resulting line to the output file. Control returns to the invoking code, which is Block 770 of FIG. 7C.

Figure 7E:
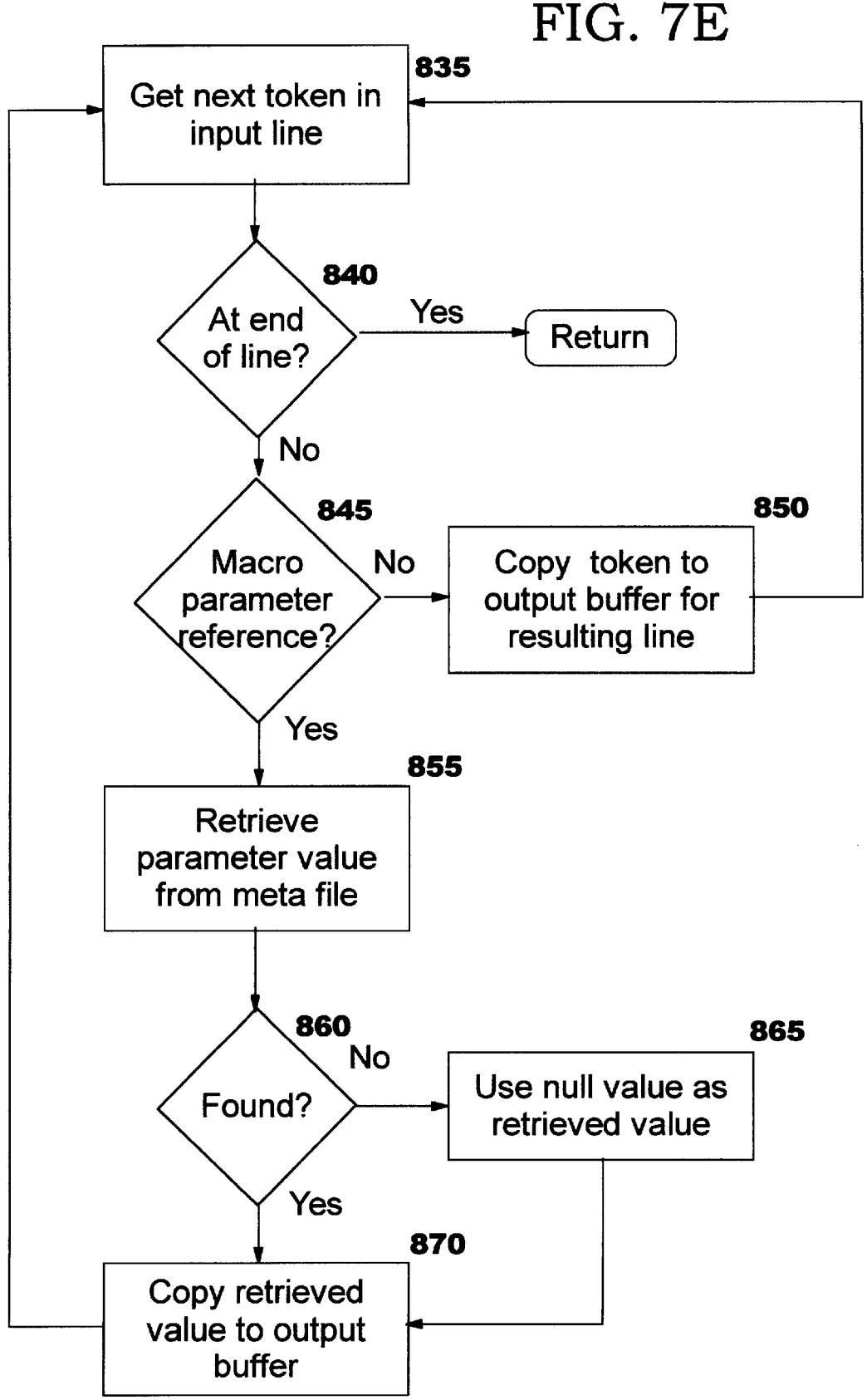

FIG. 7E depicts the logic used to implement the macro expansion for a particular macro reference. Block 835 locates the next token in the input line (which for the first pass through Block 835 is the first token). Block 840 asks whether the end of the input line has now been reached. If so, control returns to the invoking logic (which will be either Block 775 of FIG. 7C or Block 825 of FIG. 7D). The invoking code will then write the expanded line to the output file. Otherwise, when the end of the input line has not yet been reached, processing continues at Block 845 which tests to see if the current token is a macro parameter reference. If not, then Block 850 copies the current token to an output buffer or other storage area in which the generated output line is being assembled. Control then transfers back to Block 835, to get the next token. When Block 845 detects a macro parameter reference, then Block 855 retrieves the value of the corresponding parameter from the meta file. Block 860 asks if an error was encountered. Two specific examples of the errors that may occur are (1) the sequence number on the parameter reference is greater than the number of parameters specified in the meta file, so that the indicated parameter was not found, and (2) the indicated parameter was found, but it has no value. The preferred embodiment handles both of these cases by transferring control to Block 865. As indicated in FIG. 7E, a null value will then be used as the retrieved value for the parameter. This causes Block 870 to, in effect, suppress the parameter reference in that nothing will be copied to the output buffer for this parameter reference. (Alternatively, control could transfer directly to Block 835 when Block 860 has a negative result.) A warning message may be generated when an empty parameter value is encountered, if desired (not shown in FIG. 7E).

It may happen that the parameter was located in the meta file by Block 855, but its value cannot be read. (Refer to the previous discussion of this possibility, with reference to Block 795 of FIG. 7D.) The preferred embodiment treats this situation as a fatal error. An error message will be generated, and processing will halt. It will be obvious to one of skill in the art how this error processing can be added to the logic of FIG. 7E.

When no error was encountered in retrieving the parameter value from the meta file (and the value can be read), control reaches Block 870. The retrieved value is copied to the output buffer being used to assemble the output line. Control then returns to Block 835.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

I claim:

1. Computer readable code readable by a computing system in a computing environment, for combining a meta data file and Java source code file to dynamically create Java classes and JavaBeans, comprising:

a meta data file, wherein said meta data file includes specifications for one or more macros, each of said macro specifications comprising:

a name for a particular macro, wherein said name may be specified in one or more of said macro specifications; and values for one or more parameters for said particular macro;

a Java source code input file, wherein said input file comprises a plurality of lines, and wherein each of said lines may be characterized as a normal Java source code statement or as a line within a scope of a macro reference;

a Java source code output file;

a subprocess for copying each of said normal Java source code statements to said output file; and a subprocess for processing each of said lines within said scope of said macro reference, further comprising:

a subprocess for locating one or more matching macro specifications in said meta data file, wherein said name of said matching macro specification is identical to a reference name used in said macro reference;

a subprocess for expanding said lines within said scope of said macro reference using said one or more located specifications; and a subprocess for writing said expanded lines to said output file.

2. Computer readable code according to claim 1, wherein said subprocess for processing each of said lines further comprises:

a subprocess for detecting an opening macro reference, said opening macro reference specifying said reference name, and wherein said detected opening reference begins said scope of said macro reference;

a subprocess for detecting a closing macro reference, wherein said detected closing reference ends said scope of said macro reference; and wherein said detected opening and closing macro references are not themselves expanded by said subprocess for expanding.

3. Computer readable code according to claim 2, wherein said subprocess for expanding further comprises:

a subprocess for parsing each of said lines within said scope of said macro reference;

a subprocess for copying each of said parsed lines which does not contain a macro parameter reference to said output file; and a subprocess for expanding said parsed line using said located macro specification when said parsed line contains one or more of said macro parameter references.

4. Computer readable code according to claim 3, wherein said subprocess for expanding said parsed line further comprises:

a subprocess for retrieving a corresponding one of said parameter values from said located macro specification using a sequence number from said macro parameter reference; and a subprocess for substituting said retrieved parameter value for said macro parameter reference, wherein said subprocess for retrieving and said subprocess for substituting are repeated for each of said one or more macro parameter references in said parsed line.

5. Computer readable code according to claim 2, wherein said subprocess for expanding further comprises:

a subprocess for parsing each of said lines within said scope of said macro reference;

a subprocess for detecting an opening conditional macro processing statement in said parsed line;

a subprocess for evaluating said detected opening conditional macro processing statement;

a subprocess for bypassing one or more lines within said scope of said macro reference until detecting an ending conditional macro processing statement when said subprocess for evaluating has a negative result; and a subprocess for expanding one or more of said lines of said input file when said subprocess for evaluating has a positive result, until detecting said ending conditional macro processing statement.

6. Computer readable code according to claim 5, wherein said subprocess for evaluating has said positive result when a condition on said opening conditional macro processing statement evaluates to a Boolean value "True".

7. Computer readable code according to claim 6, wherein said subprocess for evaluating further comprises:

a subprocess for locating a string value in said condition;

a subprocess for retrieving a corresponding condition value from said located macro specification using a conditional parameter sequence number from said condition; and a subprocess for comparing said retrieved corresponding value to said string value.

8. Computer readable code according to claim 7, wherein said subprocess for expanding further comprises:

a subprocess for parsing each of said lines within said scope of said macro reference;

a subprocess for copying each of said parsed lines which does not contain a macro parameter reference to said output file; and a subprocess for expanding said parsed line using said located macro specification when said parsed line contains one or more of said macro parameter references.

9. Computer readable code according to claim 8, wherein said subprocess for expanding said parsed line further comprises:

a subprocess for retrieving a corresponding one of said parameter values from said matching macro specification using a sequence number from said macro parameter reference; and a subprocess for substituting said retrieved parameter value for said macro parameter reference, wherein said subprocess for retrieving and said subprocess for substituting are repeated for each of said one or more macro parameter references in said parsed line.

10. Computer readable code readable by a computing system in a computing environment, for combining a meta data file and Java source code file to dynamically create Java classes and JavaBeans, comprising:

a meta data file, wherein said meta data file includes specifications for one or more macros, each of said macro specifications comprising:

a name for a particular macro, wherein said name may be specified in one or more of said macro specifications; and values for one or more parameters for said particular macro;

a Java source code input file, wherein said input file comprises a plurality of lines;

a Java source code output file;

a subprocess for reading each of said lines of said input file;

a subprocess, responsive to said subprocess for reading, for determining whether said read line is within a scope of a macro reference;

a subprocess for copying said read line to said output file when said subprocess for determining has a negative result; and a subprocess for expanding said read line using said meta data file when said subprocess for determining has a positive result.

11. Computer readable code according to claim 10, wherein said subprocess for expanding further comprises:

a subprocess for parsing each of said lines within said scope of said macro reference;

a subprocess for copying each of said parsed lines which does not contain a macro parameter reference to said output file;

a subprocess for expanding said parsed line when said parsed line contains one or more of said macro parameter references; and a subprocess for writing said expanded parsed line to said output file.

12. Computer readable code according to claim 11, wherein:

said subprocess for determining has said positive result when an opening macro reference has been encountered but a corresponding closing macro reference has not; and said subprocess for expanding said parsed line further comprises:

a subprocess for locating one or more matching macro specifications in said meta data file using a reference name from said opening macro reference to match said macro name in said meta data file; and a subprocess for using each of said matching macro specifications to create said expanded parsed line, further comprising:

a subprocess for retrieving a corresponding one of said parameter values from said matching macro specification using a sequence number from said macro parameter reference; and a subprocess for substituting said retrieved parameter value for said macro parameter reference, wherein said subprocess for retrieving and said subprocess for substituting are repeated for each of said one or more macro parameter references in said parsed line.

13. A system for combining a meta data file and Java source code file to dynamically create Java classes and JavaBeans in a computing environment, comprising:

a meta data file, wherein said meta data file includes specifications for one or more macros, each of said macro specifications comprising:

a name for a particular macro, wherein said name may be specified in one or more of said macro specifications; and values for one or more parameters for said particular macro;

a Java source code input file, wherein said input file comprises a plurality of lines, and wherein each of said lines may be characterized as a normal Java source code statement or as a line within a scope of a macro reference;

a Java source code output file;

means for copying each of said normal Java source code statements to said output file; and means for processing each of said lines within said scope of said macro reference, further comprising:

means for locating one or more matching macro specifications in said meta data file, wherein said name of said matching macro specification is identical to a reference name used in said macro reference;

means for expanding said lines within said scope of said macro reference using said one or more located specifications; and means for writing said expanded lines to said output file.

14. The system according to claim 13, wherein said means for processing each of said lines further comprises:

means for detecting an opening macro reference, said opening macro reference specifying said reference name, and wherein said detected opening reference begins said scope of said macro reference;

means for detecting a closing macro reference, wherein said detected closing reference ends said scope of said macro reference; and wherein said detected opening and closing macro references are not themselves expanded by said means for expanding.

15. The system according to claim 14, wherein said means for expanding further comprises:

means for parsing each of said lines within said scope of said macro reference;

means for copying each of said parsed lines which does not contain a macro parameter reference to said output file; and means for expanding said parsed line using said located macro specification when said parsed line contains one or more of said macro parameter references.

16. The system according to claim 15, wherein said means for expanding said parsed line further comprises:

means for retrieving a corresponding one of said parameter values from said located macro specification using a sequence number from said macro parameter reference; and means for substituting said retrieved parameter value for said macro parameter reference, wherein said means for retrieving and said means for substituting are repeated for each of said one or more macro parameter references in said parsed line.

17. The system according to claim 14, wherein said means for expanding further comprises:

means for parsing each of said lines within said scope of said macro reference;

means for detecting an opening conditional macro processing statement in said parsed line;

means for evaluating said detected opening conditional macro processing statement;

means for bypassing one or more lines within said scope of said macro reference until detecting an ending conditional macro processing statement when said means for evaluating has a negative result; and means for expanding one or more of said lines of said input file when said means for evaluating has a positive result, until detecting said ending conditional macro processing statement.

18. The system according to claim 17, wherein said means for evaluating has said positive result when a condition on said opening conditional macro processing statement evaluates to a Boolean value "True".

19. The system according to claim 18, wherein said means for evaluating further comprises:

means for locating a string value in said condition;

means for retrieving a corresponding condition value from said located macro specification using a conditional parameter sequence number from said condition; and means for comparing said retrieved corresponding value to said string value.

20. The system according to claim 19, wherein said means for expanding further comprises:
   means for parsing each of said lines within said scope of said macro reference;
   means for copying each of said parsed lines which does not contain a macro parameter reference to said output file; and
   means for expanding said parsed line using said located macro specification when said parsed line contains one or more of said macro parameter references.

21. The system according to claim 20, wherein said means for expanding said parsed line further comprises:
   means for retrieving a corresponding one of said parameter values from said matching macro specification using a sequence number from said macro parameter reference; and
   means for substituting said retrieved parameter value for said macro parameter reference, wherein said means for retrieving and said means for substituting are repeated for each of said one or more macro parameter references in said parsed line.

22. A method for combining a meta data file and an object-oriented source code input file to create an object-oriented source code output file that will be used to dynamically create objects at compile time in a computing environment, comprising the steps of:
   creating a meta data file, wherein said meta data file includes specifications for one or more macros, each of said macro specifications comprising:
      a name for a particular macro, wherein said name may be specified in one or more of said macro specifications; and
      values for one or more parameters for said particular macro;
   creating an object-oriented source code input file, wherein said input file comprises a plurality of lines, and wherein each of said lines may be characterized as a normal object-oriented source code statement or as a line within a scope of a macro reference;
   copying each of said normal object-oriented source code statements to an object-oriented source code output file; and
   processing each of said lines within said scope of said macro reference, further comprising the steps of:
      locating one or more matching macro specifications in said meta data file, wherein said name of said matching macro specification is identical to a reference name used in said macro reference;
      expanding said lines within said scope of said macro reference using said one or more located specifications; and
      writing said expanded lines to said output file.

23. The method according to claim 22, wherein said processing each of said lines step further comprises the steps of:
   detecting an opening macro reference, said opening macro reference specifying said reference name, and wherein said detected opening reference begins said scope of said macro reference;
   detecting a closing macro reference, wherein said detected closing reference ends said scope of said macro reference; and
   wherein said detected opening and closing macro references are not themselves expanded by said expanding step.

24. The method according to claim 23, wherein said expanding step further comprises the steps of:
   parsing each of said lines within said scope of said macro reference;
   copying each of said parsed lines which does not contain a macro parameter reference to said output file; and
   expanding said parsed line using said located macro specification when said parsed line contains one or more of said macro parameter references.

25. The method according to claim 24, wherein said expanding said parsed line step further comprises the steps of:
   retrieving a corresponding one of said parameter values from said located macro specification using a sequence number from said macro parameter reference; and
   substituting said retrieved parameter value for said macro parameter reference, wherein said retrieving step and said substituting step are repeated for each of said one or more macro parameter references in said parsed line.

26. The method according to claim 23, wherein said expanding step further comprises the steps of:
   parsing each of said lines within said scope of said macro reference;
   detecting an opening conditional macro processing statement in said parsed line;
   evaluating said detected opening conditional macro processing statement;
   bypassing one or more lines within said scope of said macro reference until detecting an ending conditional macro processing statement when said evaluating step has a negative result; and
   expanding one or more lines of said input file when said evaluating step has a positive result, until detecting said ending conditional macro processing statement.

27. The method according to claim 26, wherein said evaluating step has said positive result when a condition on said opening conditional macro processing statement evaluates to a Boolean value "True".

28. The method according to claim 27, wherein said evaluating step further comprises the steps of:
   locating a string value in said condition;
   retrieving a corresponding condition value from said located macro specification using a conditional parameter sequence number from said condition; and
   comparing said retrieved corresponding value to said string value.

29. The method according to claim 28, wherein said expanding step further comprises the steps of:
   parsing each of said lines within said scope of said macro reference;
   copying each of said parsed lines which does not contain a macro parameter reference to said output file; and
   expanding said parsed line using said located macro specification when said parsed line contains one or more of said macro parameter references.

30. The method according to claim 29, wherein said expanding said parsed line step further comprises the steps of:
   retrieving a corresponding one of said parameter values from said matching macro specification using a sequence number from said macro parameter reference; and
   substituting said retrieved parameter value for said macro parameter reference, wherein said retrieving step and said substituting step are repeated for each of said one or more macro parameter references in said parsed line.

31. The method according to claim 22, wherein said object-oriented source code input file and said object-oriented source code output file use the Java programming language.

32. A method for combining a meta data file and an object-oriented source code input file to create an object-oriented source code output file that will be used to dynamically create objects at compile time in a computing environment, comprising the steps of:

creating a meta data file, wherein said meta data file includes specifications for one or more macros, each of said macro specifications comprising:

a name for a particular macro, wherein said name may be specified in one or more of said macro specifications; and values for one or more parameters for said particular macro;

creating an object-oriented source code input file, wherein said input file comprises a plurality of lines, selected ones of said lines including one or more macro references; and creating an object-oriented source code output file by expanding said macro references in said source code input file using corresponding ones of said macro specifications in said meta data file.

* * * * *